(12) United States Patent
Nikovski et al.

(10) Patent No.: US 7,555,399 B1
(45) Date of Patent: Jun. 30, 2009

(54) METHOD AND SYSTEM FOR DETECTING CHANGES IN SENSOR SAMPLE STREAMS

(75) Inventors: Daniel N. Nikovski, Cambridge, MA (US); Ankur Jain, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 11/738,562

(22) Filed: Apr. 23, 2007

(51) Int. Cl.
*G06F 19/00* (2006.01)
(52) U.S. Cl. ..................... 702/116
(58) Field of Classification Search ............... 702/89, 702/116, 125, 178, 179, 188, 196; 382/14, 382/21, 30; 345/424; 780/323
See application file for complete search history.

(56) References Cited

U.S. PATENT DOCUMENTS

| | | | | |
|---|---|---|---|---|
| 4,953,386 A | * | 9/1990 | Pearman et al. | 73/1.27 |
| 6,647,343 B1 | * | 11/2003 | Guthrie et al. | 702/30 |
| 2007/0097065 A1 | * | 5/2007 | Kreek et al. | 345/102 |
| 2007/0103464 A1 | * | 5/2007 | Kaufman et al. | 345/424 |

* cited by examiner

*Primary Examiner*—Bryan Bui
(74) *Attorney, Agent, or Firm*—Dirk Brinkman; Gene Vinokur (57) ABSTRACT

A method detects a change in a stream of samples acquired by a sensor. A stream of samples acquired by a sensor over time is stored sequentially in a buffer in which an oldest samples is discarded and a newest sample is stored when the buffer is full, such that the buffer forms a window of samples sliding forward in time. For each new sample, the buffer is partitioned into all possible pairs of contiguous sub-windows of samples including a first sub-window and a second sub-window such that the newest sample is stored in the second sub-window of the pair. A difference is determined between the first and second sub-window of each pair of the contiguous sub-windows of samples, and a maximum difference is assigned as a merit score. A change in the stream of samples is signaled if the merit score is greater than a predetermine threshold. The change can be abrupt or gradual.

11 Claims, 10 Drawing Sheets

Inputs:
Sliding window size: $N$
Sliding window: $\Gamma^t = \{x_1, \ldots, x_N\}$
Distance function: $d(x_1, x_2)$ /* e.g., $d(x_1, x_2) = \|x_1 - x_2\|$ */

Local variables:
Parital-sum vector: $\beta = \{\beta[i] | 1 \leq i \leq N\}$
Recurrent merit score: $C$  /* Max. merit-score for an $(i,j)$ pair */

Outputs:
Merit-score: $\Upsilon^t_{MB-GT}$ /* Max. merit-score for $\Gamma^t$ */

1: for $i = 1$ to $N$ do
2:     $\beta[i] = 0$                                  /*Reset the array values to zero*/
3: end for
4: for $j = (N-1)$ to $2$ do
5:     $C = 0$
6:     for $i = (j-1)$ to $1$ do
7:         $\beta[i] = \beta[i] + d(x_i, x_j)$    /*Incrementally update the partial sums*/
8:         $C = C + \beta[i]$
9:         $\Upsilon^t_{MB-GT} = \max(\frac{C}{(j-i)(N-j)}, \Upsilon^t_{MB-GT})$ /*Updating merit-score*/
10:    end for
11: end for
12: return $\Upsilon^t_{MB-GT}$

*Fig. 5*

Inputs:

Sliding window size: $N$

Sliding window: $\Gamma^t = \{x_1, \ldots, x_N\}$

Kernel function: $w(z) = \frac{1}{\sigma\sqrt{2\pi}} exp^{-\|z\|^2/2\sigma^2}$

Local variables:

Parital-sum vector: $v = \{v[i] | 1 \leq i \leq M\}$

Recurrent merit score: $S$ /* Max. merit-score for an $(i,j)$ pair */

Global variables:

Parital-sum vector: $\mu = \{\mu[i] | 1 \leq i \leq M\}$

First run indicator: init=true /* Changes state when the algorithm is called the first time */

Outputs:

Merit-score: $\Upsilon^t_{MB-CUSUM}$ /* Max. merit-score for $\Gamma^t$ */

*Fig. 6*

```
 1: if init then
 2:     for i = 1 to N do
 3:         μ[i] = 0
 4:     end for
 5:     init=false
 6: end if
 7: for i = 1 to N − 1 do
 8:     v[i] = 0
 9:     μ[i] = μ[i + 1] + w(x_i − x_N)
10: end for
11: v[N] = 0
12: μ[N] = w(0)
13: for i = (N − 2) to 1 do
14:     S = 0
15:     for j = (N − 1) to i + 1 do
16:         v[i] = v[i] + w(x_i − x_j)              /*Incrementally update the v vector*/
17:         S = S + log( μ[j](j−i) / v[j](N−j) )
18:     Υ^t_MB−CUSUM = max((S, Υ^t_MB−CUSUM)  /*Updating merit-score*/
19:     end for
20: end for
21: return Υ^t_MB−CUSUM
```

/*Reset the μ vector*/

/*Reset the v vector*/
/*Updating the μ vector*/

*Fig. 7*

METHOD AND SYSTEM FOR DETECTING CHANGES IN SENSOR SAMPLE STREAMS

FIELD OF THE INVENTION

This invention relates generally to monitoring equipment and an environment with sensors, and more particularly to detecting changes in sensor samples.

BACKGROUND OF THE INVENTION

Sensor Data

Up to now, real-time detailed monitoring of equipment and/or an environment with sensors has only been economically feasible for large, expensive, safety- and mission-critical installations. However, the rapid progress of computer technology, and more specifically, the advent of low-cost sensor networks, cheap wireless communications, and powerful embedded processors, has made it possible to implement equipment condition monitoring (ECM) technology for much cheaper equipment, such as electrical motors, turbines, power switchgear, HVAC equipment, as well as for an ever expanding range of industrial processes, such as oil refining, food processing, product manufacturing, and large scale environments.

The resulting increase in the amount of sensor data that are constantly streaming from sensor networks would quickly overwhelm any human supervisor tasked with monitoring the data. The only viable solution to the problem of processing the sensor data quickly and accurately is to develop automated change detection (ACD) methods. Whereas such automated methods are not likely to reach the competence and versatility of a well-trained human supervisor, automated methods can still be very effective and accurate, when designed to look for specific events in the sensor data stream.

One of the most important among these events is an abrupt change in the sensor data. Detecting such abrupt changes is not a trivial problem, because all but the simplest data streams vary, even when no change in the process that generates the data has occurred. This might be caused either by the natural variability of the process, e.g., when the data comes from a dynamical system, or noise that is due to measurement errors, hidden variables and the like. In such cases, the detection of abrupt changes is done in a statistical sense, i.e., the problem reduces to detecting a difference between probability distributions from which the data are sampled, before and after the change. In manufacturing applications, this task is often called statistical process control (SPC). In SPC, the objective is to detect a departure from the in-control distribution of the data to some other, out-of-control distribution.

CUSUM

When the in-control and out-of-control distributions have known parametric forms and the respective parameters are known, it has been shown that the cumulative sum (CUSUM) procedure is optimal, Page, "Continuous Inspection Schemes," Biometrika 41, pp. 100-114, 1954, and Basseville et al., "Detection of Abrupt Changes: Theory and Application," Englewood Cliffs, N.J.: Prentice Hall, 1993.

However, explicit modeling of the in-control and all possible out-of-control distributions is typically a laborious and expensive process, and might even be intractable. Therefore, it is desired to provide a method that can detect any changes only by inspecting the sensor data streams and reasoning about their probability distributions.

Abrupt Change Detection

At a current time t, a d-dimensional data vector from a sensor sample stream is $x_t$. The problem of abrupt change detection is to determine whether such a change has occurred at or before the current time t. An important assumption for this problem is that the change is assumed to be permanent, i.e., after the change has occurred, all subsequent readings come from a new distribution. This is the typical situation for industrial equipment when the change is destructive, e.g., equipment fails.

All sensor samples before the change are assumed to be independent and identically-distributed (i.i.d.) random variables sampled from a distribution $p_0(x)$. Similarly, all samples after the change are assumed to be i.i.d. variables sampled from a distribution $p_1(x)$.

For cases when the distributions $p_0(x)$ and $p_1(x)$ are known, Page describes the CUSUM procedure that accumulates the log-likelihood of the current samples with respect to the two distributions, and makes a decision based on the auxiliary variable $g_t = S_t - m_t$ for $$m_t = \min_{\leq j \leq t} S_j, \quad S_t = \Sigma_{i=1}^{t} s_i,$$

and $$s_i = \log \frac{p_1(x_t)}{p_0(x_t)}.$$

A change is declared to have occurred if $g_t > h$ for a predetermined threshold h. This decision can be shown to be optimal with respect to maximizing the detection probability, for a given false-positive rate.

However, the CUSUM method has the significant disadvantage that both distributions $p_0(x)$ and $p_1(x)$ must be known before hand. Specifying an accurate probability distribution $p_0(x)$ for the normal operation of industrial equipment or normal conditions in an environment is typically hard and laborious even for the very engineers who designed the equipment. Specifying all possible distributions $p_1(x)$ for the out-of-control case might be outright impossible. Furthermore, the correct parametric forms for these distributions might not be available.

These limitations of CUSUM have spurred extensive research on alternative methods for ACD that are more data driven and do not rely on pre-specified distributions. An important direction of research is to use nonparametric statistics, such as rank statistics, Brodsky et al., "Nonparametric Methods in Change-Point Problems," Kluwer, 1991.

Machine Learning

Another line of research has focused on ACD methods based on machine learning. With machine learning, the fundamental idea is to 'learn' (fit) two probability distributions from the samples before and after a hypothesized change point, and then to test for differences between the two distributions, often using information-theoretic distance measures such as the Kullback-Leibler divergence, and Rényi divergence, Guha et al., "Streaming and sublinear approximation of entropy and information distances," Proceedings of SODA'06, pp. 733,742, ACM Press, 2006. However, there are a number of problems with such methods.

The first problem is to learn the two distributions from the samples. When the two distributions are known to be Gaussian, the sample means and variances for two sub-windows can be determined, and the two distributions can be compared using Student's t-statistic, Gosset, "The probable error of the mean," Biometrika, 1908.

The much more important case is when the two probability density functions (pdfs) of the distributions are not Gaussian. For example, when the distributions are multi-modal due to the system switching between several distinct modes. Gaussian mixture models, which are otherwise an excellent choice for modeling multi-modal distributions, are fairly poor solutions for this particular problem because they are parametric and their fitting requires multiple iterative adjustments of the respective parameters, Hastie et al., "The Elements of Statistical Learning," Springer, 2001. This is prohibitively time consuming when considering many possible change points. Thus, such methods are not suitable for time-critical applications.

A much better alternative is to use memory-based methods, such as Parzen's kernel density estimate, Parzen "On estimation of a probability density function and mode," Ann. Math. Stat. 33, pp. 1065-1076, 1962, also known as the Nadaraya-Watson estimate of a probability density function, see Hastie et al. In that method, the probability density p(x) is represented as a normalized sum of kernel values:

$$p(x) = \frac{1}{n}\sum_{i=1}^{n} w(x - x_i), \quad (1)$$

where ω is a suitably selected kernel function, and $x_i$, i=1, n are samples drawn from the distribution to be modeled. Popular choices for the kernel are Gaussian and tri-cubic distributions.

The second problem is comparing the two distributions after they have been fit from the samples. Some popular methods employ information-theoretic distance measures, such as the well known Kullback-Leibler (KL) divergence:

$$D_{KL}(p_0 \| p_1) = \int \int \ldots \int_{x \in \Omega} p_0(x) \log \frac{p_0(x)}{p_1(x)} dx.$$

The main difficulty when using the KL divergence is the need to integrate over the entire domain Ω of the samples x. This can be time consuming, even in one-dimensional domains, and might be impossible in multivariate cases. Using other popular information-theoretic distance measures, such as the Rényi divergence, the Jensen-Shannon distance, the Bregman divergence, and the Hellinger-Matsushita-Bhattacharya distance, leads to similar integration-related difficulties.

As a result, much research has focused on approximate computation of these distances. For example, Guha et al. describe several polynomial-time approximation schemes (PTAS) that can compute approximations to most of the above distances in polynomial time. While valuable from a theoretical point of view, similar PTAS methods are not very likely to result in practical methods that can be used for monitoring in practical applications.

Another method, based on machine learning uses two sub-windows of a buffer storing samples from which the two pdfs are estimated. If the window size is made large, then the asymptotic fit to the true pdf from which the data were sampled is good. However, if the size of the window is large, the new samples start to affect the post-change distribution very slowly, resulting in increasing the detection times when an actual change in distributions occurs, making it difficult to detect abrupt changes.

SUMMARY OF THE INVENTION

The embodiments of the invention provide a method for detecting any changes in a stream of sensor samples that deals with a contradiction. The invention uses sub-windows of varying sizes, both before and after a possible change point. This enables both fast reaction to drastic or abrupt changes, for post-change sub-windows of a small size, e.g., only one sample, as well as sensitivity to more subtle changes using distributions learned from larger windows. A direct implementation of this idea results in an increase of computational complexity to $O(N^4)$. However, the embodiments of the invention provide efficient implementations of the method that reduce this increase in complexity.

The embodiments of the invention provide a method for detecting any change in multivariate sensor sample streams. That is the method can detect abrupt changes in real-time, as well as slowly evolving changes over longer time periods. The method can be applied when no explicit models of data distributions, before and after the change, are available.

The methods operate on a sliding window of samples stored in a memory buffer. The buffer stores the most recent N samples. Each new sample causes the oldest sample to be removed from the buffer. The method considers all possible partionings of the buffer into two contiguous sub-windows of samples before and after a time a possible change could have occurred. Differences are determined between each pair of the contiguous sub-windows of samples, and a maximum difference is assigned as a merit score. Then, a change in the stream of samples can be signaled if the merit score is greater than a predetermined threshold.

One embodiment of the method measures an average Euclidean distance between the pairs of sub-windows of samples as a decision variable. Another embodiment of the method is based on the conventional CUSUM method. However, in contrast, with the conventional method, the probability density functions are unknown, and instead of using log-likelihood estimates of the known distributions, the method estimates the distributions with Parzen's kernel density estimates.

DETAILED DESCRIPTION OF THE PREFERRED EMBODIMENTS

Figure 1A:
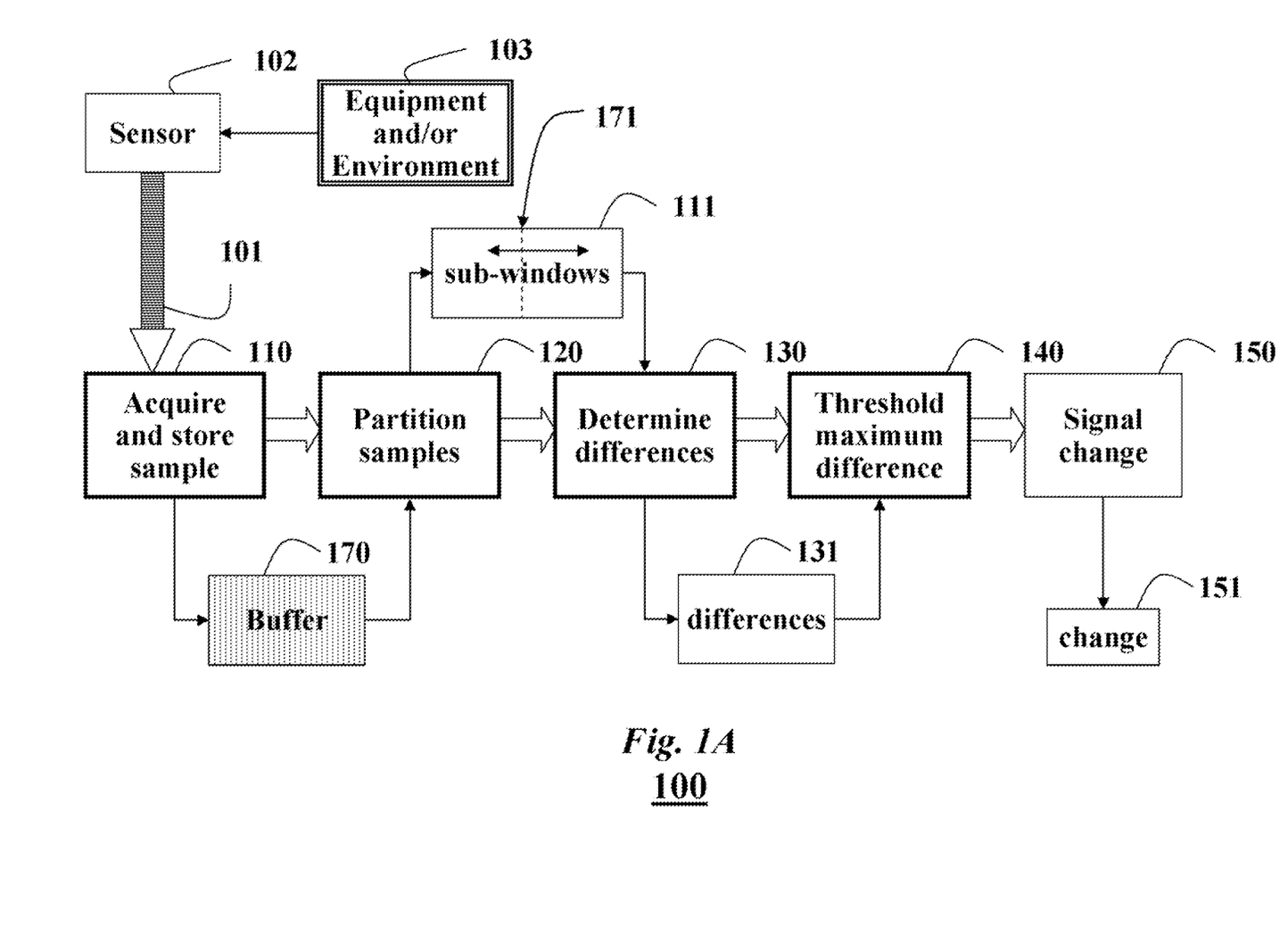
FIG. 1A is a glow diagram of a method for detecting a change in a multivariate sensor data sample stream according to an embodiment of our invention.

FIG. 1A shows a method 100 for detecting any change in a multivariate sensor data sample stream 101 acquired sequentially over time by a sensor 102 from equipment and/or an environment 103. The samples 101 are stored 110 in a buffer 170, in which an oldest sample is discarded and a newest sample is stored when the buffer is full, such that the buffer 170 forms a window of samples sliding forward in time.

Then, for each new sample, the buffer is partitioned 120 into all possible pairs of contiguous sub-windows 111 of samples before and after a time 171 a possible change could have occurred, such that the newest sample is stored in the second sub-window of the pair. Differences 131 between each pair of all possible contiguous sub-windows 111 of the samples are determined 130. A maximum difference is assigned as a merit score, which is threshold 140 and a change 151 is signaled 150 if the merit score is greater than a predetermine threshold.

All embodiments of the invention operate on pairs of contiguous windows of samples that have variable sizes. That is, the method considers all possible partitions of the buffer 170 of size N samples. Both methods share a common computational structure that can be exploited to significantly reduce the computational cost of considering all possible partitions of the memory buffer. Both methods work on a buffer $\Gamma^t$, which contains the most recent sensor samples, always renumbered for convenience from $x_1$ to $x_N$, such that $x_N$ is the newest sample, and $x_1$ is the oldest sample; i.e., the buffer is a window of samples sliding forward in time.

A difference procedure 130 $\alpha$ determines the quantitative merit score $\gamma_t^\alpha$, which is in proportion to the possibility that a change has occurred within the span of the samples in the buffer. In particular, the merit score $\gamma_t^\alpha$ can be, but is not limited to, a distance measure between two sub-windows of the buffer 170. Typically, conventional methods simply partition the buffer into two equal sub-windows of samples and test for a difference between the two equal parts. In contrast, we partition the buffer into all possible pairs of sub-windows, including sub-windows storing a single sample.

Figure 1B:
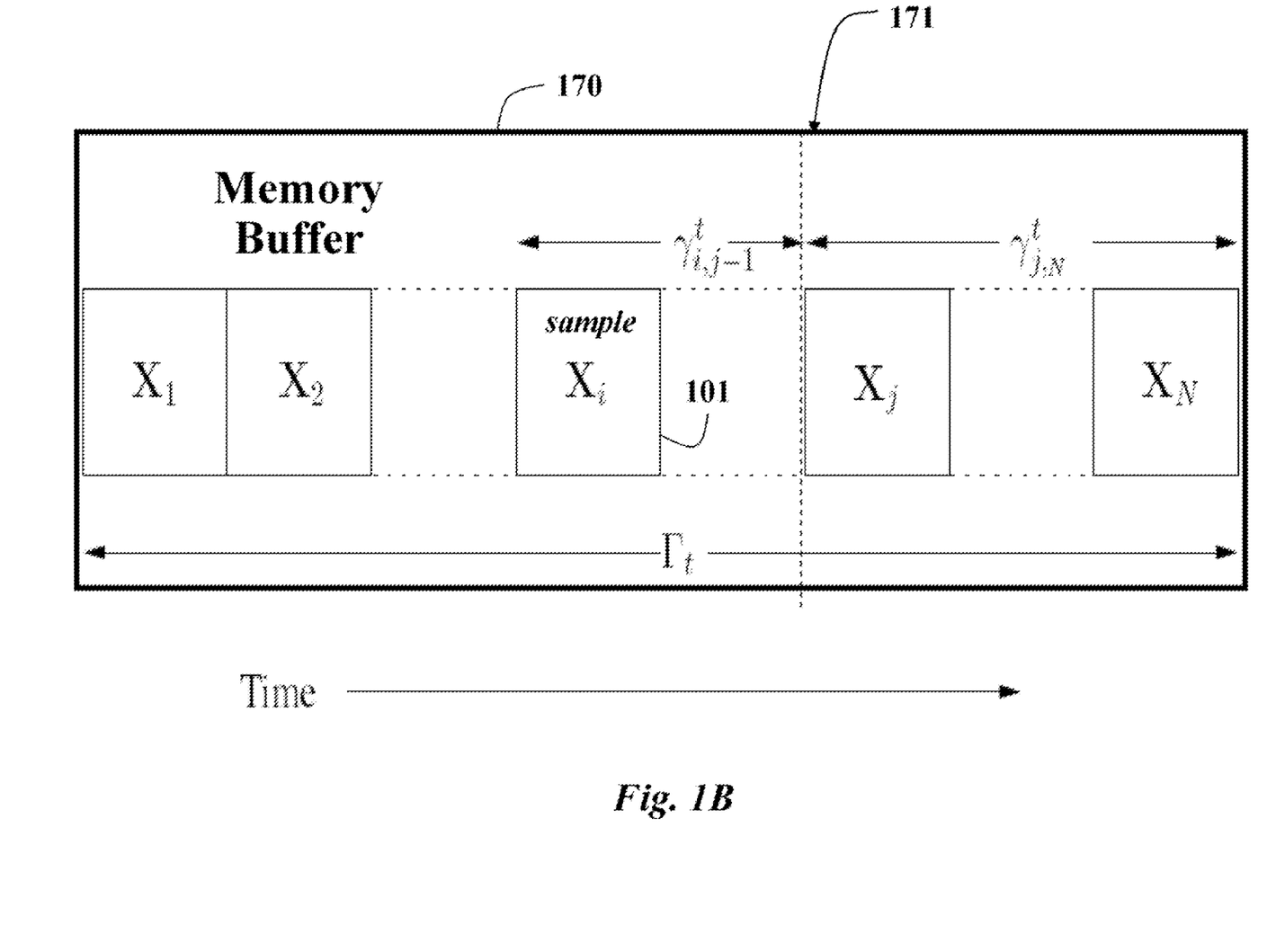
FIG. 1B is a block diagram of a buffer storing sensor samples according to an embodiment of the invention.

As shown in FIG. 1B, a temporally sequential window of samples 101, in a form of a vector x, are stored consecutively in the buffer 170. The methods described below consider all possible pairs of indices (i,j) of sub-windows of the window of sensor samples x, such that $1 \leq i \leq j \leq N$, that partition the buffer $\Gamma^t$ 170 storing the samples x 152 into two adjacent sub-windows $$\gamma^t_{i,j\ldots 1} \text{ and } \gamma^t_{j,N}.$$

Here, time t increases from left to right, and $$\gamma^t_{p,q} = \{x_p, \ldots, x_q\}.$$

Figure 2A:
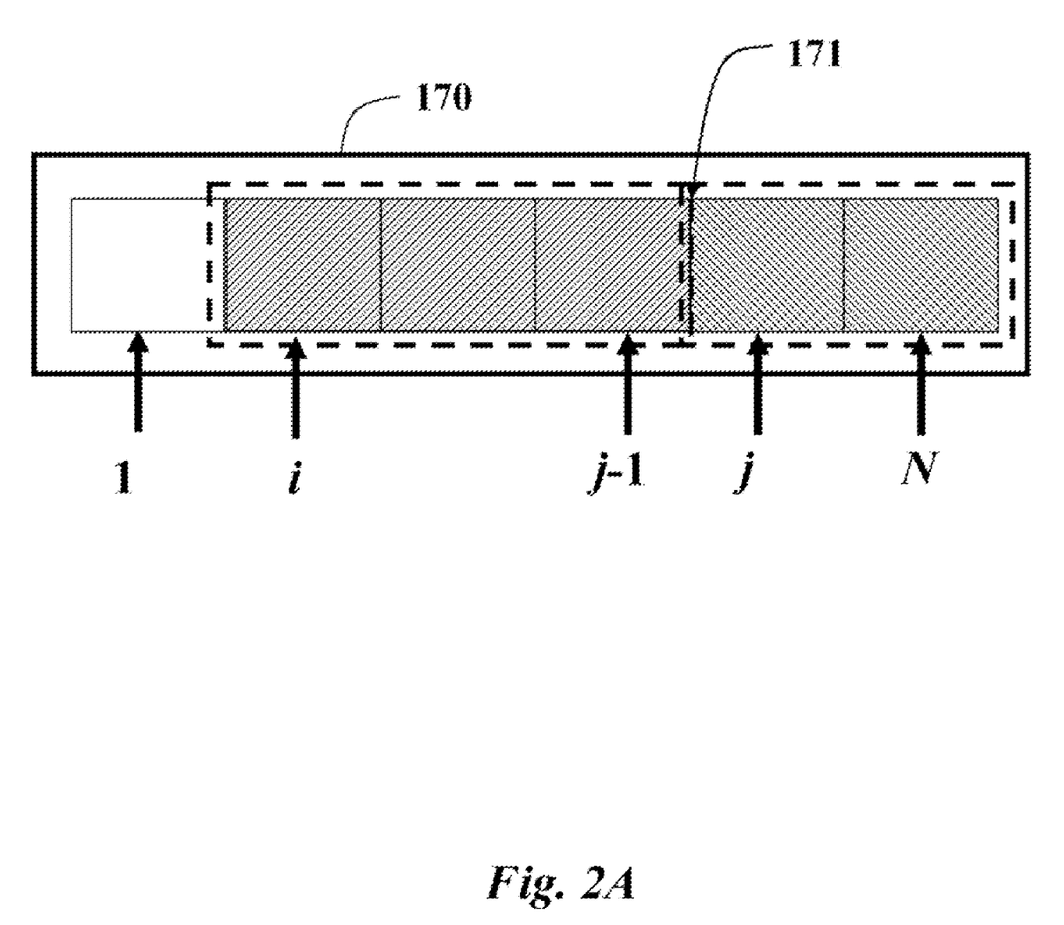
FIG. 2A is a block diagram of the buffer of FIG. 2 partitioned into unequal sub-windows.

FIG. 2A shows the buffer 170 with samples 1 to N. The sample with index i defines the beginning of the first sub-window of the pair, and the sample with index j defines the first sample of the second sub-window, and, respectively, the hypothesized change point associated with the partitioning 171. The sample at the end of the first sub-window has index j−1, ensuring contiguity of the pair of sub-windows, whereas the end of the second sub-window is always the newest sample, $x_N$.

The two sub-sets of samples stored in the two sub-windows can have an unequal number of samples. A sub-window might even consist of a single sample. Therefore, a sub-window of samples can includes one or more samples, i.e., the number of samples in a sub-window can be in the range [1, N−1].

If a difference or merit score $\gamma_t^\alpha(i,j)$ is determined for each possible pair of sub-windows, subject to the listed constraints, then the overall merit score is the maximum over all partitionings:

$$\gamma_t^\alpha = \max_{1 \leq i \leq j \leq N} \gamma_t^\alpha(i,j).$$

Then, the modeling challenge is to determine which merit score to use. The computational challenge is to do this in a computationally efficient manner for each new sample, $x_i$.

A Memory-Based Graph Theoretic Procedure (MB-GT)

Figure 2B:
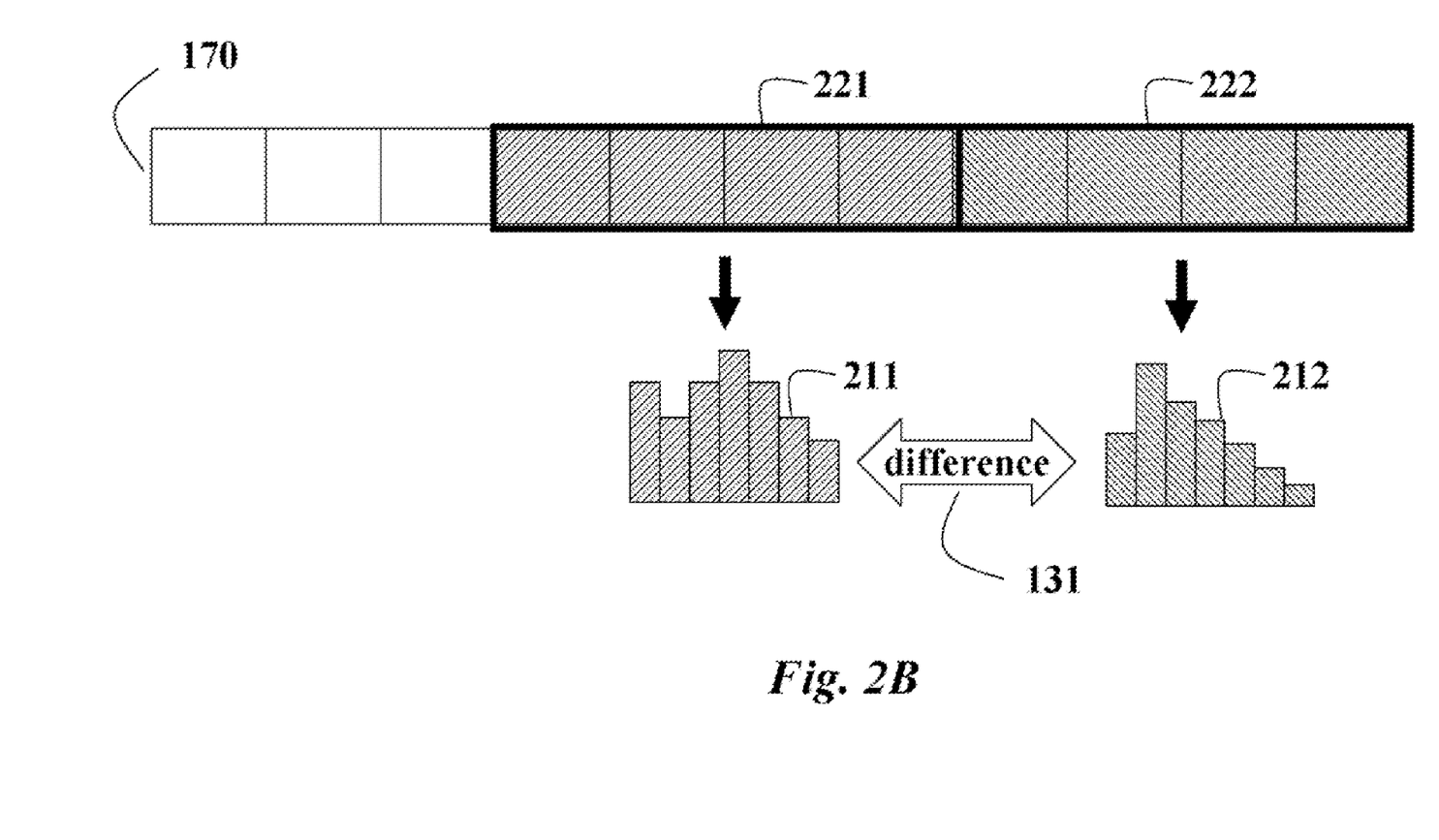
FIG. 2B is a block diagram of different distributions of sample values according to an embodiment of the invention.

As shown in FIG. 2B, one solution to the problem of determining the difference 200 (distance) between two distributions 211-212 of the two sub-windows 221-222 of samples is to determine the average distance (difference) between the samples themselves. Because each sample is a data point in a multi-dimensional Euclidean space, a natural distance measure between the sub-windows of samples $x_k$ and $x_l$ is their Euclidean distance $$d_{k,l} = \|x_k - x_l\|.$$

For a particular partitioning defined by the index pair (i,j) specified as above, we can determine the average distance between the two sub-windows of samples as $$C_{i,j} = \frac{\sum_{k=i}^{j-1} \sum_{l=j}^{N} d_{k,l}}{(j-i)(N-j+1)}.$$

This memory-based graph theoretic method has a merit score $$\gamma_t^\alpha = \max_{1 \leq i \leq j \leq N} C_{i,j}.$$

Because determining each $C_{i,j}$ is of complexity of $O(N^2)$, and there are $O(N^2)$ such terms to be considered, the overall complexity is $O(N^4)$. This complexity is unacceptable for practical applications.

However, the determination of individual $C_{i,j}$ terms has certain redundancy and repetitive structure that can be exploited to bring the computational complexity back down to $O(N^2)$.

If we define $$C'_{i,j} \doteq \sum_{k=i}^{j-1} \sum_{k=j}^{N} d_{k,l} \quad \beta_{i,j} \doteq \sum_{l=j}^{N} d_{i,l}$$

then the following recurrent relationship hold:

$$\beta_{i,j-1} = \beta_{i,j} + d_{i,j-1},$$

with $$\beta_{i,N+1} = 0,$$

And $$C'_{i-1,j} = C'_{i,j} + \beta_{i-1,j},$$

with $$C'_{i,j} = 0 \text{ for all } 1 \leq j \leq N.$$

Figure 3:
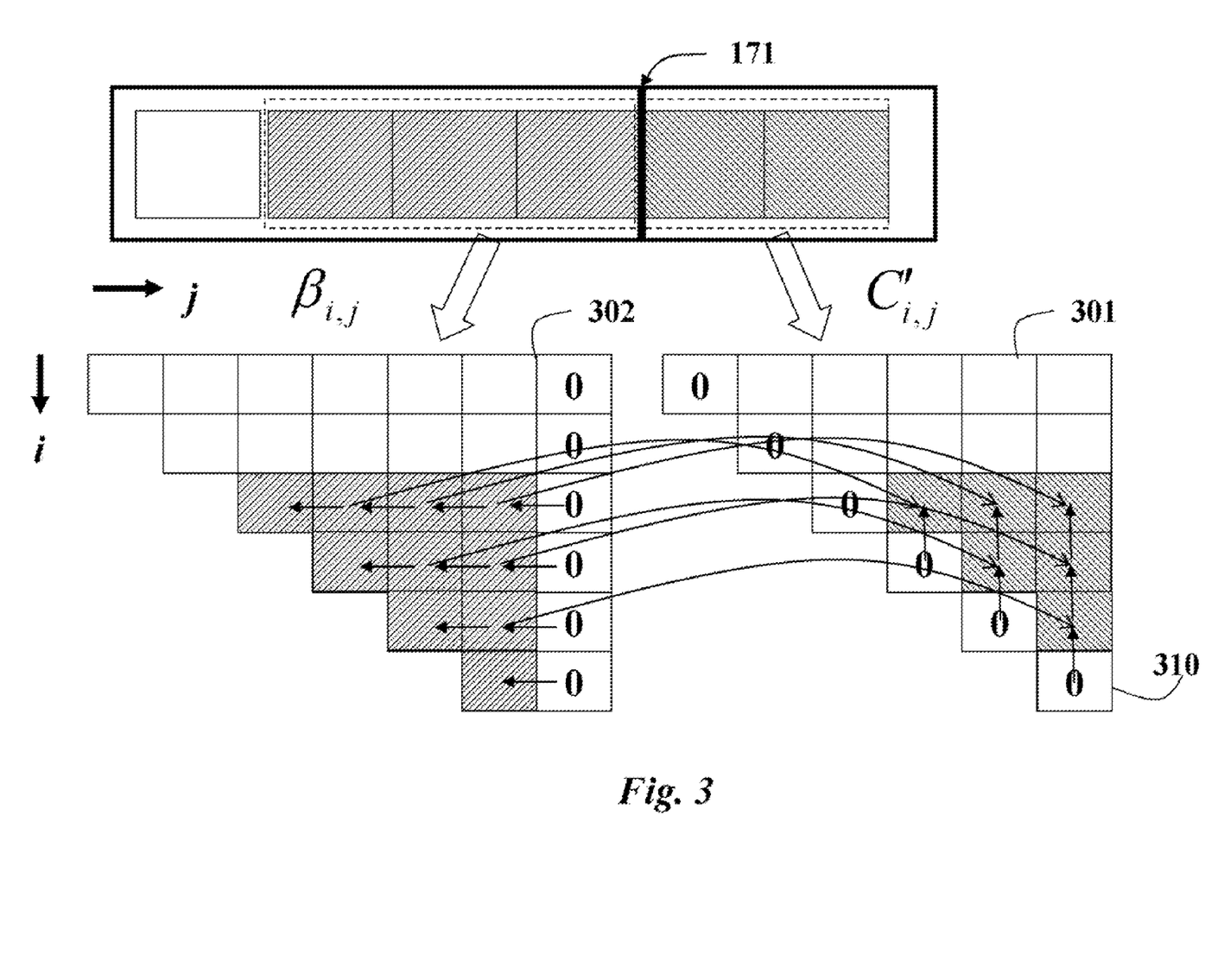
FIG. 3 is a block diagram of triangular data structure for determining differences of samples according to an embodiment of the invention.

As shown in FIG. 3, these recurrences suggest the following efficient computational process. The values $\beta_{i,j}$ and $C'_{i,j}$ are stored in data structures 301-302 that are conceptually similar to a matrix. This matrix is upper triangular due to the constraint i<j. Computation can start with the bottom row 310 of this matrix, which has a single element $C'_{N,N}$, which is zero by definition. For each row $1 \leq i \leq N$ above the previous row one, proceeding from bottom to top, two steps are performed:

1) All values $\beta_{i,j}$ are computed recurrently from their immediate adjacent sample to the right, proceeding right to left, and using the recurrence:

$$\beta_{i,j-1} = \beta_{i,j} + d_{i,j-1}.$$

2) All values $C'_{i,j}$ are computed from the respective values $\beta_{i,j}$ and the values $C'_{i+1,j}$ in the row immediately below the current one, using the recurrence $C'_{i,j} = C'_{i+1,j} + \beta_{i,j}$.

Determining the merit score, $\gamma_t^\alpha$, can be done concurrently with the computation of the individual terms $C'_{i,j}$, because that only involves normalization and maximization. For this reason, it is not necessary to store all values $C'_{i,j}$ and $\beta_{i,j}$ in the buffer. It suffices to keep a buffer of size N samples for the current row i of values $\beta_i$, and two buffers of the same size for $C'_{i,j}$ and $C'_{i+1,j}$. Thus, the memory requirement of this procedure is only $O(N)$, and the complexity of the computation is only $O(N^2)$.

A Memory-Based CUSUM Procedure (MB-CUSUM)

Figure 4A:
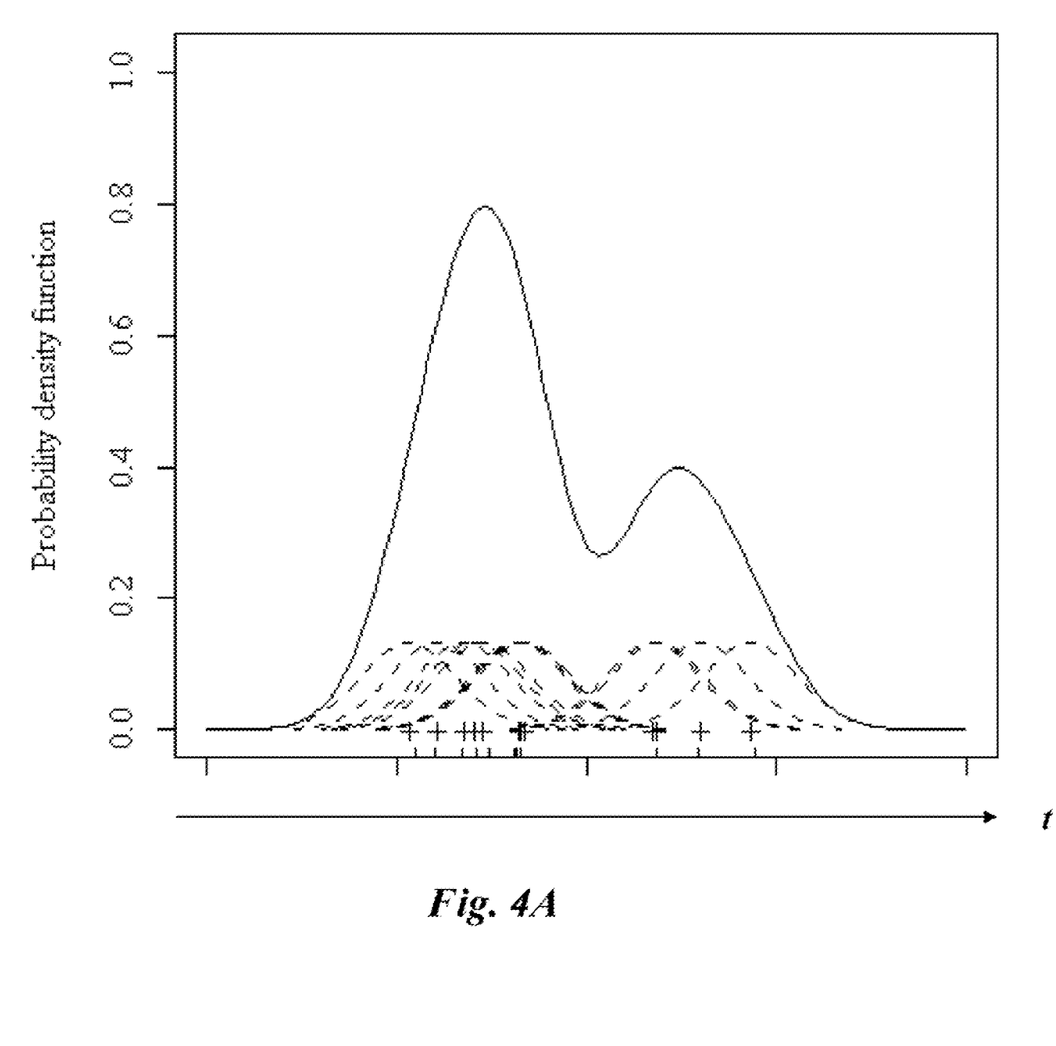
FIG. 4A are kernel functions according to an embodiment of the invention.

As shown in FIG. 4A, the second embodiment of the invention has a probabilistic foundation, which enables the method to achieve optimal change detection under certain modeling conditions. Because the distributions of the samples are unknown, we first learn the distribution by Parzen's kernel density estimates, e.g. with Gaussian or tricubic probability distribution function. In FIG. 4A, the vertical axis is the probably of the distributions, and the horizontal axis time.

At the same time, despite its very different theoretical foundation, the second method has similar computational structure to the first embodiment. We describe how this structure can be leveraged to achieve the same significant improvements in computational complexity.

Following the derivation of CUSUM, we consider the following hypotheses about a possible change within the N samples stored in the buffer 170:

$$H_{i,0} : x_k \sim p_0 \text{ for } i \leq k \leq N \quad (2)$$

$$1 \leq i \leq j \leq N, H_{i,j} : x_k \sim p_0 \text{ for } i \leq k \leq j-1 \quad (3)$$

$$x_l \sim p_1 \text{ for } j \leq l \leq N \quad (4)$$

Here, we are considering the null hypotheses $H_{i,j}$ that no change has occurred while the most recent N−i+1 sample are acquired, versus multiple hypotheses $H_{i,j}$ that such a change has occurred. By introducing the starting index i, we are expanding the set of hypotheses to be tested to those that do not necessarily use all N samples in the window.

According to the Neyman-Pearson lemma, Hoel et al., "Testing Hypotheses," Ch. 3 in *Introduction to Statistical Theory*, New York: Houghton Mifflin, pp. 56-67, 1971, incorporated herein by reference, the best test that we can perform when testing each particular hypothesis $H_{i,j}$ vs. $H_{i,j}$, i.e., the test that has the highest probability of rejecting a false null hypothesis, is the likelihood ratio $$\Lambda_{i,j} = \frac{\prod_{k=i}^{j-1} p_0(x_k) \cdot \prod_{l=j}^{N} p_1(x_l)}{\prod_{k=i}^{N} p_0(x_k)}.$$

For convenience, the log-likelihood ratio $S_{i,j} = \log(\Lambda_{i,j})$ is commonly used. In our method, we replace the true pdfs $p_0$ and $p_1$ with their kernel density estimates, as described by Equation (1), to result in $$S_{i,j} = \sum_{l=i}^{N} \log. \quad (5)$$

Here $\omega_{l,k}$ is a kernel weight for the pair of samples ($x_l$, $x_k$) and it also holds that the weights $\omega_{l,k} = \omega(d_{l,k})$. By using the maximum likelihood principle, the merit score for this procedure is $$\gamma_t^\alpha = \max_{1 \leq i \leq j \leq N} S_{i,j}.$$

As above, a computation of the merit score has a computational complexity of $O(N^4)$. However, this merit score has a similar structure to the merit score for the embodiment method that can again be exploited to reduce its computational complexity.

Figure 4B:
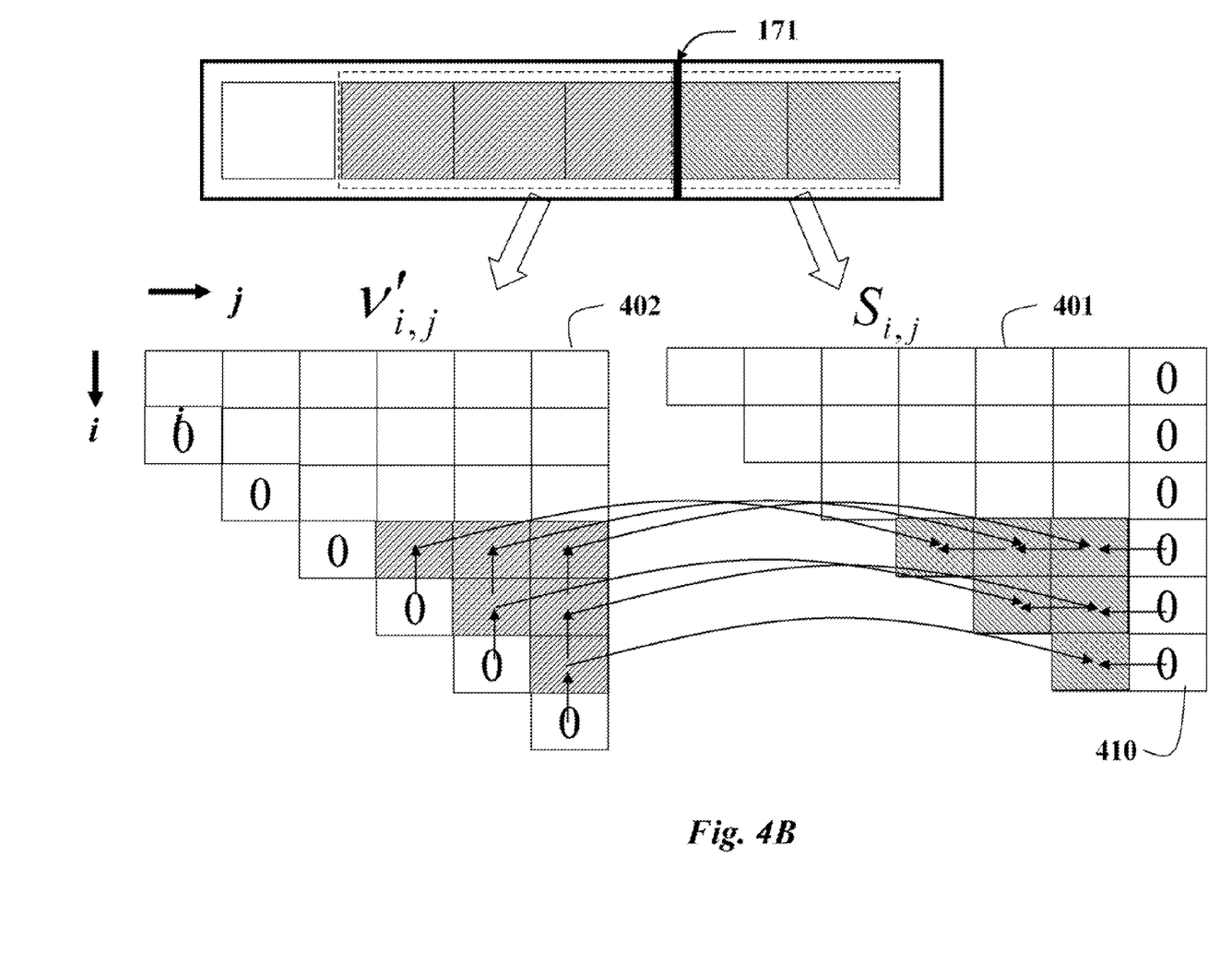
FIG. 4B is a block diagram of triangular data structures according to an embodiment of the invention.

As shown in FIG. 4B, again, we can conceptually organize values of the windows $S_{i,j}$ and $v'_{i,j}$ 401-402 in triangular data structures, and define the following auxiliary variables:

$$\mu_j^i = \sum_{k=j}^{N} w_{l,k} \quad v_{i,j}^l = \sum_{k=i}^{j-1} w_{l,k}. \quad (6)$$

Although there appear to be $O(N^3)$ $v'_{i,j}$ terms to be computed, the recurrent re-formulation of Equation 5

$$S_{i,j} = S_{i,j+1} + \log \mu_j^i + \log (j-i) - \log(N-j+1) \quad (7)$$

convinces us that not all of the terms are needed. By further defining $\mu'_j = \mu_j^i$, and $v'_{i,j} = v_{i,j}^i$, we can use the following equations as a basis for an efficient procedure:

$$\mu_j^i = \sum_{k=j}^{N} w_{j,k} \quad v_{i,j}^l = v_{i+1,j}^l + w_{i,j}. \quad (8)$$

Note that only the term for $v'_{i,j}$ is recurrent; the term for $\mu'_j$ is computed directly. These equations suggest the following procedure:

S1: Compute $\mu'_j$ for j=1, N directly, per Equation (8). This computation has complexity $O(N^2)$, but the results can be stored in $O(N)$ space.

S2: For each row i=N, 1 of the matrix $S_{i,j}$, starting from the bottom row 410, i=N and moving upwards to the first row i=1, perform the following two steps:

S2.1: For each value of j between i+1 and N, compute $v'_{i,j}$ from the corresponding $v'_{i+1,j}$ in the row below, and $\omega_{j,i}$, per Equation (8).

S2.2: For each value of j between N and i+1, compute $S_{i,j}$ from the value $S_{i,j+1}$ immediately to the right, using the equation $S_{i,j}=S_{i,j}+1+\log \mu'_j-\log v'_{i,j}+\log (j-i)-\log (N-j+1)$, starting with $S_{i,N+1}=0$ for all $i=1, N$. The computation in this step proceeds strictly right to left ($j=N, i+1$).

Figure 5:
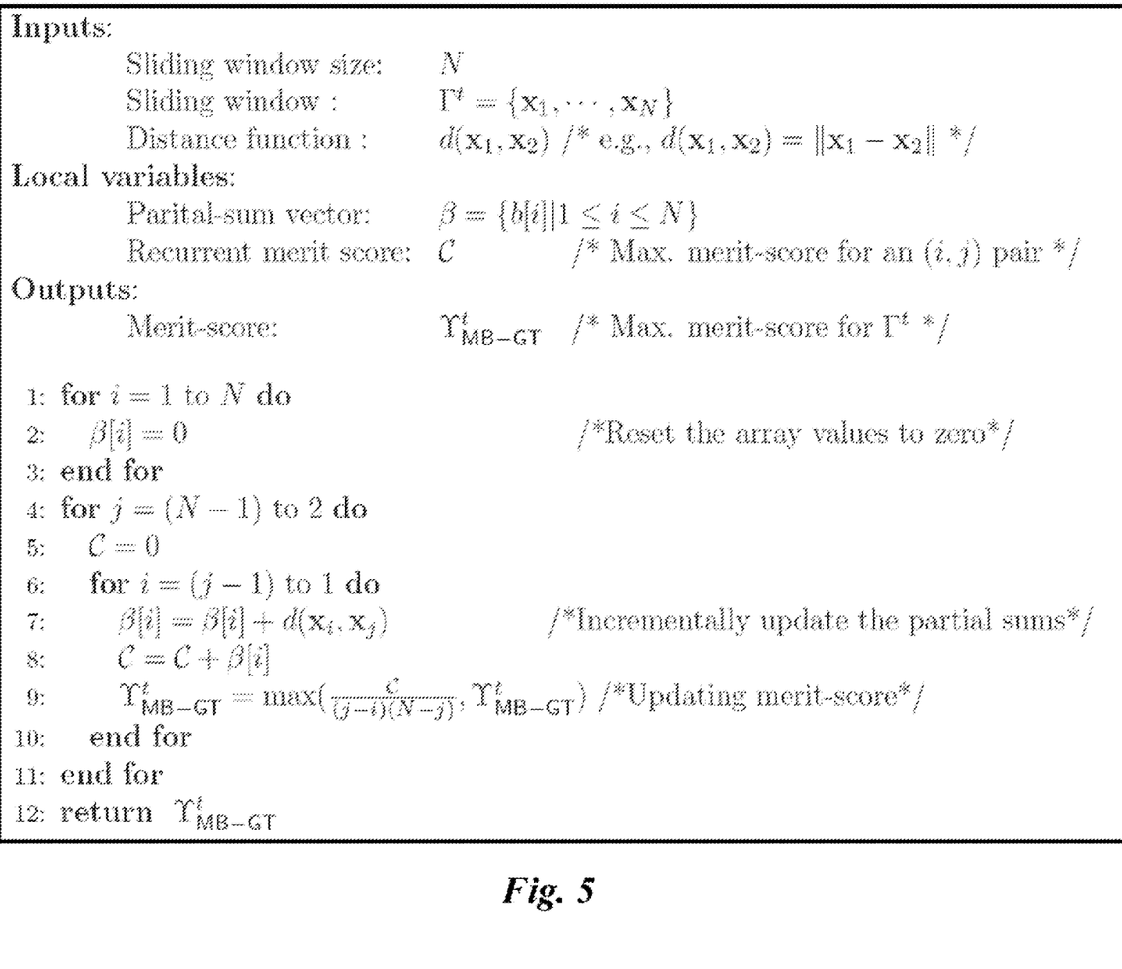
FIG. 5 is a block diagram of pseudo code for a memory based, graph theoretic (MB-GT) method for detecting an abrupt change in sensor data according to an embodiment of the invention.
Figure 6:
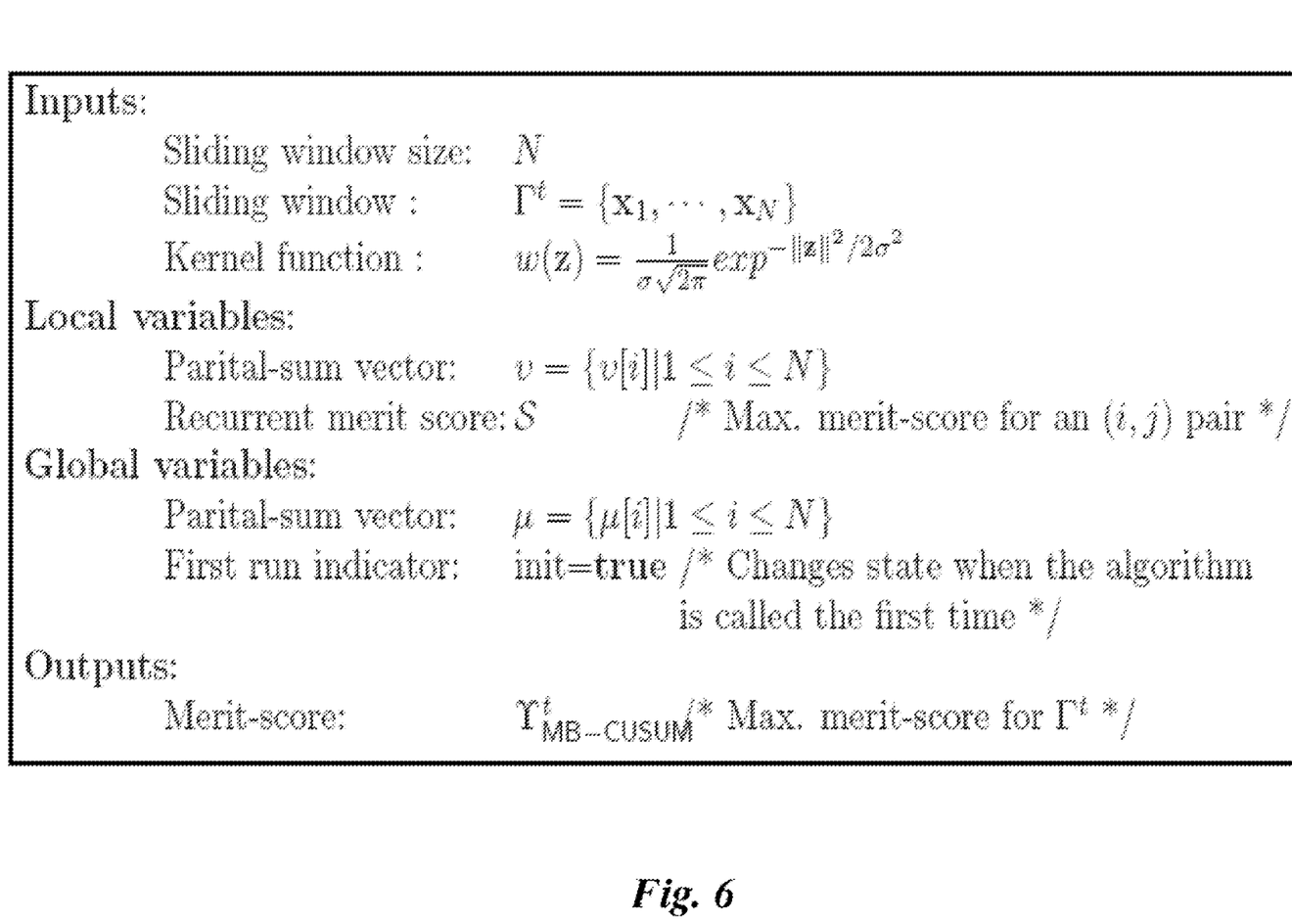
FIG. 6 is a block diagram of variables used by memory based cumulative sum (MB-CUSUM) method for detecting an abrupt change in sensor data according to an embodiment of the invention.
Figure 7:
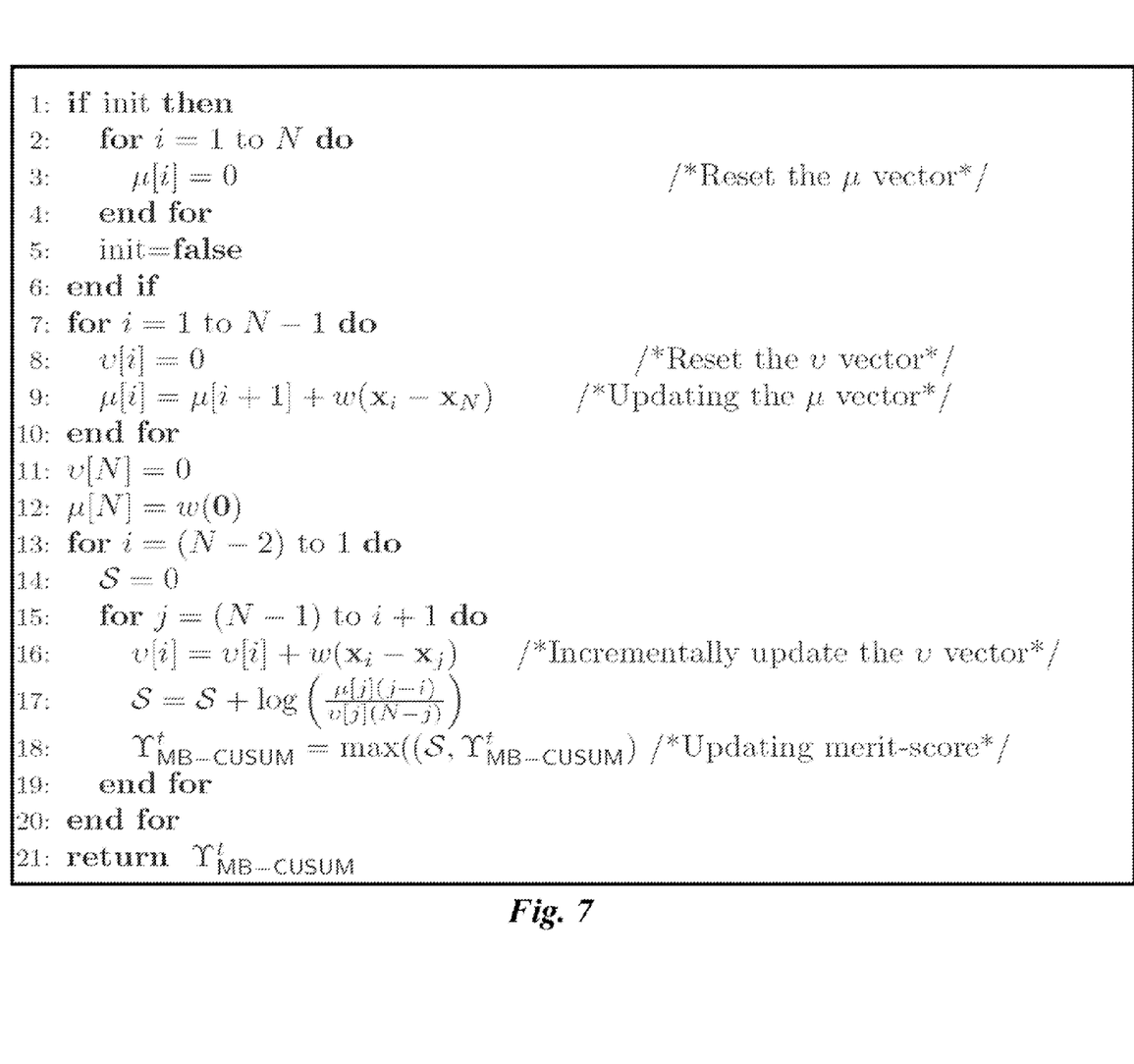
FIG. 7 is a block diagram of pseudo code used by the memory-based cumulative sum method.

FIG. 5 shows pseudo code for the first memory-based graph theoretic (MB-GT) method that determines $\gamma^t_{MB-GT}$ in greater detail. FIG. 3 shows the variables for the second memory-based cumulative sum (MB-CUSUM) method that determines $\gamma^t_{MB-CUSUM}$, and FIG. 4 shows the pseudo code in greater detail.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for detecting a change in a stream of samples acquired by a sensor, comprising the steps of:
    storing sequentially a stream of samples acquired by a sensor over time in a buffer in which an oldest sample is discarded and a newest sample is stored when the buffer is full, such that the buffer forms a window of samples sliding forward in time;
    partitioning, for each new sample, the buffer into all possible pairs of contiguous sub-windows of samples including a first sub-window and a second sub-window such that the newest sample is stored in the second sub-window of the pair;
    determining a difference between the first and second sub-window of each pair of the contiguous sub-windows of samples;
    assigning a maximum difference as a merit score; and
    signaling a change in the stream of samples if the merit score is greater than a predetermined threshold.

2. The method of claim 1, in which the change is abrupt in time.

3. The method of claim 1, in which the change evolves relatively slowly over time.

4. The method of claim 1, in a distribution of the samples is unknown.

5. The method of claim 1, in the difference is a Euclidian distance between values of the samples in the first sub-window and the second sub-window.

6. The method of claim 1, in which the first and second sub-windows have an unequal number of samples.

7. The method of claim 1, in which the number of sample in the buffer is N, and the number of samples in the sub-windows can be in the range of [1, N−1].

8. The method of claim 1, in which a complexity of the difference determination is $O(N^2)$, where N is a number of samples stored in the buffer.

9. The method of claim 1, in which values of the samples in the first and second sub-window are stored in respective triangular matrices, and the differences are determined recurrently from immediate adjacent samples.

10. The method of claim 1, further comprising:
    estimating the distributions using Parzen's kernel estimates.

11. The method of claim 10, in which the differences are determined using a cumulative sum procedure of log-likelihoods of the kernel estimates.

* * * * *